US010227201B2

(12) United States Patent
Hanson et al.

(10) Patent No.: US 10,227,201 B2
(45) Date of Patent: Mar. 12, 2019

(54) AUTOMATED MAIL TRAY LOADING SYSTEM AND METHOD

(71) Applicant: Toshiba International Corporation, Houston, TX (US)

(72) Inventors: Bruce Hanson, Endicott, NY (US); Jeffrey Anthony Gavenas, Grapevine, TX (US)

(73) Assignee: Toshiba International Corporation, Houston, TX (US)

( * ) Notice: Subject to any disclaimer, the term of this patent is extended or adjusted under 35 U.S.C. 154(b) by 0 days.

(21) Appl. No.: 15/378,712

(22) Filed: Dec. 14, 2016

(65) Prior Publication Data

US 2017/0173639 A1 Jun. 22, 2017

Related U.S. Application Data

(60) Provisional application No. 62/268,274, filed on Dec. 16, 2015.

(51) Int. Cl.

| | |
|---|---|
| ***B65G 11/04*** | (2006.01) |
| ***B07C 5/00*** | (2006.01) |
| ***B65H 31/06*** | (2006.01) |
| ***B65H 31/04*** | (2006.01) |
| ***B65H 31/30*** | (2006.01) |

(Continued)

(52) U.S. Cl.

CPC ......... *B65H 31/3072* (2013.01); *B07C 3/008* (2013.01); *B07C 5/3412* (2013.01); *B65H 31/06* (2013.01); *B65H 31/24* (2013.01); *B65H 31/3009* (2013.01); *B65H 43/06* (2013.01); *B65H 2301/422548* (2013.01);

(Continued)

(58) Field of Classification Search

CPC ...... B07C 3/008; B65G 57/035; B65G 57/06; B65G 2207/46; B65G 57/245; B65G 1/0435; Y10S 209/90; B65B 5/108; B65H 2301/422548; B65H 2301/422615; B65H 31/06; B65H 31/3018; Y10T 83/2046

USPC ............ 209/509, 900; 414/265, 281, 416.09, 414/593, 789, 789.7, 79.9, 790.5, 790.6, 414/794.2, 794.3; 53/247, 260, 443, 473

See application file for complete search history.

(56) References Cited

U.S. PATENT DOCUMENTS 1,992,166 A * 2/1935 Beauclerk .............. B65B 25/18 53/257

3,120,249 A * 2/1964 Keone ................... B65D 19/20 141/172

(Continued)

*Primary Examiner* — Gregory W Adams

(74) *Attorney, Agent, or Firm* — Baker Botts L.L.P.

(57) ABSTRACT

Presently disclosed embodiments are directed to a system and method for loading mail trays in a sorter without human intervention. Specifically, the disclosed embodiments utilize an automated mail tray having a bottom plate that is selectively moveable between an elevated position and a lowered position. The automated mail tray may be positioned on a shelf under a corresponding output pocket of a mail stacker, and the bottom plate may be elevated to receive mail product transferred from the output pocket to the automated mail tray. After receiving the mail product on the elevated bottom plate, the bottom plate of the mail tray may be lowered so that the mail product is transferred from the output pocket to a position fully situated in the automated mail tray. The mail tray filled with mail product may then be removed from the shelf and replaced with an empty automated mail tray.

19 Claims, 3 Drawing Sheets

(51) Int. Cl.

| | |
|---|---|
| ***B07C 5/34*** | (2006.01) |
| ***B07C 3/00*** | (2006.01) |
| ***B65H 31/24*** | (2006.01) |
| ***B65H 43/06*** | (2006.01) |

(52) U.S. Cl.

CPC .... *B65H 2405/332* (2013.01); *B65H 2511/51* (2013.01); *B65H 2701/1916* (2013.01)

(56) References Cited

U.S. PATENT DOCUMENTS

| | | | | | |
|---|---|---|---|---|---|
| 3,782,541 | A * | 1/1974 | Wood | B07C 3/008 | 209/584 |
| 4,030,620 | A * | 6/1977 | Euverard | B65G 65/00 | 198/779 |
| 4,104,846 | A * | 8/1978 | Waller | B65B 5/108 | 414/791.6 |
| 4,195,959 | A * | 4/1980 | Schmitt | B65G 57/035 | 414/788.9 |
| 4,298,413 | A * | 11/1981 | Teare | B28B 5/027 | 156/269 |
| 4,522,292 | A * | 6/1985 | Euverard | B65G 57/22 | 198/339.1 |
| 4,581,876 | A * | 4/1986 | Williams | B65B 7/26 | 53/136.4 |
| 4,815,924 | A * | 3/1989 | Jaatinen | B65G 57/035 | 414/793.3 |
| 4,993,916 | A * | 2/1991 | Dorner | B65G 47/082 | 198/468.11 |
| 5,347,790 | A * | 9/1994 | Romanenko | B07C 3/008 | 414/790.3 |
| 5,662,454 | A * | 9/1997 | Baufreton | B07C 1/025 | 271/2 |
| H1747 | H * | 9/1998 | Saeki | 53/443 | |
| 6,647,616 | B1 * | 11/2003 | Matsumura | H01L 21/67144 | 29/739 |
| 6,897,395 | B2 * | 5/2005 | Shiibashi | B07C 3/082 | 209/584 |
| 7,112,031 | B2 * | 9/2006 | Harres | B07C 3/008 | 209/509 |
| 8,020,701 | B2 * | 9/2011 | Berdelle-Hilge | B07C 3/008 | 206/425 |
| 2012/0047851 | A1 * | 3/2012 | Germunson | B65B 5/108 | 53/443 |

* cited by examiner

AUTOMATED MAIL TRAY LOADING SYSTEM AND METHOD

CROSS REFERENCE TO RELATED APPLICATIONS

This application claims priority to U.S. Provisional Application Ser. No. 62/268,274, entitled "Automated Mail Tray Loading System and Method," filed Dec. 16, 2015, which is herein incorporated by reference in its entirety.

TECHNICAL FIELD

Embodiments of the present disclosure relate to mail handling and processing systems for mail and related articles and, more particularly, to systems and methods for automatically loading mail from sortation output pockets into a receiving tray designed for the purpose of moving items to a feed mechanism or to dispatch and shipping.

BACKGROUND

Mail received at a post office or other location is sorted or otherwise processed so that it can be directed to a desired location. To accomplish this function, sortation machines with output pockets are used to sort various mail products. Typically, the product that arrives in the output pockets of a sortation machine is removed manually and placed in movable containers, trays, or other containing devices so that it can be moved through additional sortation processes or dispatched to arrive at its intended destination. As an example, letters sorted on a Delivery Bar Code Sorter (DBCS) arrive in letter trays. An operator manually moves the letters from the trays onto a feeder load ledge to begin the sort process. Once sorted to the sorter pockets of the DBCS, an operator removes the letters from the output pockets and places them in a labeled letter tray so they can be transported to the next processing step. In addition to being manually intensive, this process is prone to operator error. For example, an operator may accidently drop a handful of mail or place the mail in the wrong tray, thereby losing an intended order of the mail or sending it to the wrong location. A portable bridge is sometimes used to bridge the distance between individual output pockets and corresponding trays, but this type of bridge is cumbersome and takes time to transport from one set of output pockets/trays to another.

Therefore, it is now recognized that a need exists for an efficient and simple to operate mechanism that would eliminate the errors that naturally occur through operators manually removing items from sorter output pockets and placing those items in containing devices for processing or delivery.

SUMMARY

In accordance with the above, presently disclosed embodiments are directed to a system and method for loading automation trays in a mail stacker/sorter without human intervention. The system includes a mail stacker having at least one output pocket. The mail stacker may be a Delivery Bar Code Sorter (DBCS), or any other mail sorting machine, designed to receive mail product and to sort/stack at least a portion of the mail product into the output pocket. The system also includes a shelf disposed under the output pocket, and this shelf may be a part of the mail stacker. The system utilizes an automated mail tray having a bottom plate that is selectively moveable between an elevated position and a lowered position. The automated mail tray may be removably disposed on the shelf in order to receive mail product transferred from the output pocket to the elevated bottom plate of the automated mail tray. Specifically, the elevated bottom of the automated mail tray may interface with a lower portion of the output pocket so that mail product that is stacked into the output pocket is supported on the elevated bottom plate of the mail tray. After receiving the mail product on the elevated bottom plate, the automated mail tray may lower the bottom plate to the lowered position so that the mail product is transferred from the output pocket to a position fully situated in the automated mail tray. At this point, the automated mail tray filled with mail product may be removed from the shelf and replaced with an empty automated mail tray, and the process may be repeated.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Illustrative embodiments of the present disclosure are described in detail herein. In the interest of clarity, not all features of an actual implementation are described in this specification. It will of course be appreciated that in the development of any such actual embodiment, numerous implementation specific decisions must be made to achieve developers' specific goals, such as compliance with system related and business related constraints, which will vary from one implementation to another. Moreover, it will be appreciated that such a development effort might be complex and time consuming, but would nevertheless be a routine undertaking for those of ordinary skill in the art having the benefit of the present disclosure. Furthermore, in no way should the following examples be read to limit, or define, the scope of the disclosure.

Figure 1:
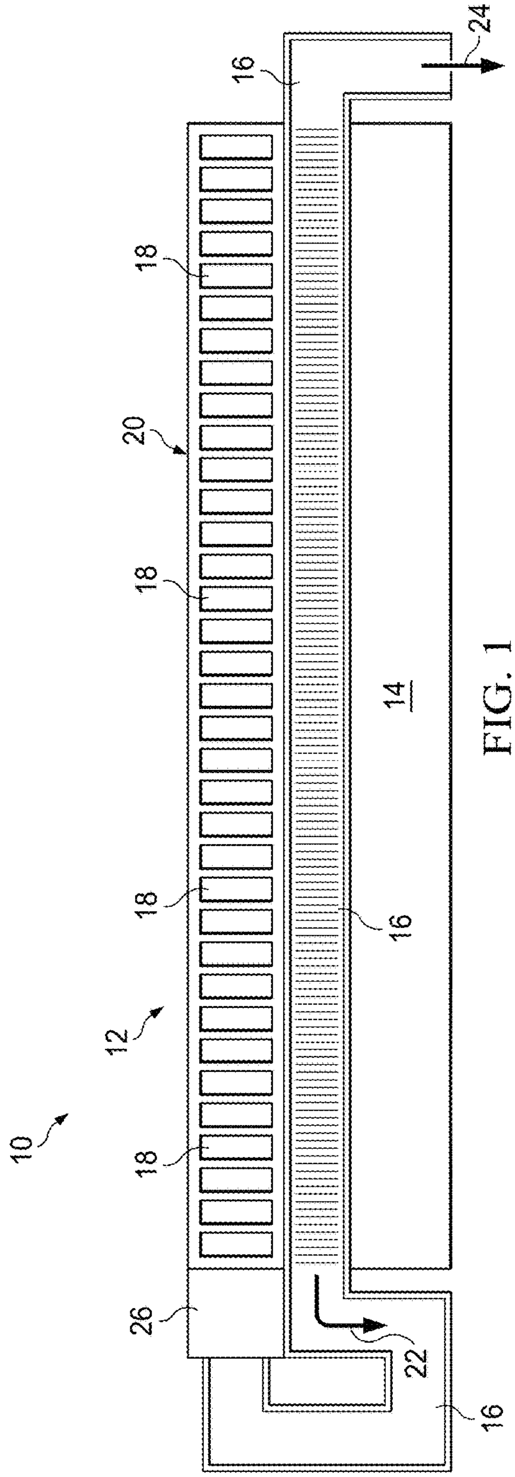
FIG. 1 is a schematic top view of an automated mail sortation and transportation system, in accordance with an embodiment of the present disclosure.

Turning now to the drawings, FIG. 1 illustrates a mail sortation and transportation system 10 used to sort mail product and deliver the product to a desired destination. As shown, the mail sortation and transportation system 10 may include a mail stacker 12, a tray storage and movement system 14, and a tray to feeder path 16. The mail stacker 12 may be a Delivery Bar Code Sorter (DBCS) in some embodiments. The mail stacker 12 may receive mail product and sort the mail according to bar codes that indicate where the mail should be delivered. The mail stacker 12 then delivers and stacks the sorted mail into output pockets 18. These output pockets 18 may be arranged in columns and/or rows to form a wall 20 of output pockets 18.

The mail stacker 12 may also include a number of shelves disposed between adjacent rows of the output pockets 18, as described in detail below. The shelves may be arranged in columns and/or rows to match the output pockets 18, and the shelves may function together as a storage rack for holding one or more receiving containers used to collect sorted mail. The disclosed mail sortation and transportation system 10 may be designed to control and automate the transfer of mail between one or more output pockets 18 of the mail stacker 12 and corresponding receiving containers, as described in detail below.

It should be noted that the disclosed mail stacker 12 may include any desirable type or size of mail stacker and/or sorter. For example, the mail stacker 12 may have 48, 206, or any other desirable total number of output pockets 18. The mail stacker 12 may include these output pockets 18 assembled in one, two, three, four, five, six, or more tiers stacked one over the other, depending on the height of the individual pockets 18 and the height of the receiving containers used to collect the mail from the output pockets 18. The mail stacker 12 may have the same number and configuration of shelves as the mail stacker 12 has rows of output pockets 18.

The tray storage and movement system 14 is disposed adjacent the mail stacker 12 and may be used to store receiving containers. For example, the tray storage and movement system 14 may include racks upon which to store receiving containers that have been filled with mail product from the mail stacker 12 or empty receiving containers to be provided to the mail stacker 12. The tray storage and movement system 14 may include a storage rack having more slots for holding receiving containers than the number of shelf positions in the mail stacker 12, thus enabling the tray storage and movement system 14 to store the filled or empty receiving containers away from the shelves.

In some embodiments, the receiving containers may be transported between the tray storage and movement system 14 and the mail stacker 12 manually by an operator. In other embodiments, however, the tray storage and movement system 14 may be designed to automatically move a filled receiving container from a given shelf and to replace it with an empty receiving container. To that end, the tray storage and movement system 14 may utilize roller conveyors, elevators, robots, and other types of automated transportation devices. The tray storage and movement system 14 may be fully automated to read tagged receiving containers and to use that information to present filled receiving containers in a desired order for a second pass through the mail stacker 12 (arrow 22) or for dispatch (arrow 24).

The tray to feeder path 16 is a conveyor that moves receiving containers filled with mail product to an upstream location (e.g., feeder) 26 of the mail stacker 12. From this upstream location 26 of the mail stacker 12, the mail product is sorted into the output pockets 18 of the mail stacker 12. The tray to feeder path 16 may provide receiving containers holding new unsorted mail to the mail stacker 12. In some embodiments, the tray to feeder path 16 may also provide receiving containers holding mail that has already been sorted by the mail stacker 12 and subsequently deposited into the receiving containers and moved to the tray storage and movement system 14. In this case, the tray to feeder path 16 may be controlled to transport the sorted mail back to the upstream location 26 of the mail stacker 12 (arrow 22) so that the mail stacker 12 can perform a second pass on sorting and stacking the mail product, or to transport the sorted mail to a dispatch location (arrow 24). As illustrated, the tray to feeder path 16 may be elevated above the mail stacker 12 so that the tray storage and movement system 14 is able to automatically move filled receiving containers of mail from the mail stacker 12 onto the tray to feeder path 16.

Figure 2:
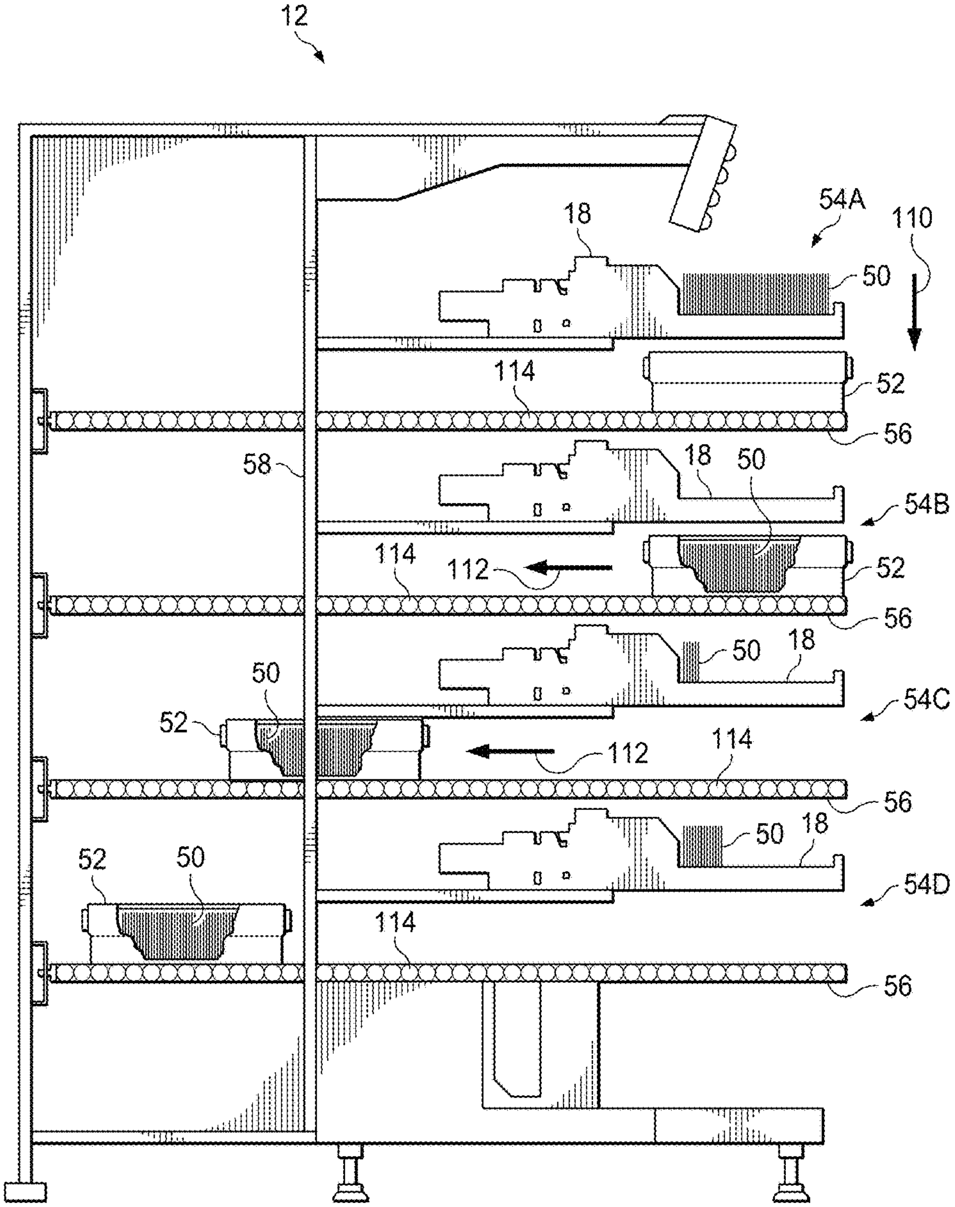
FIG. 2 is a schematic partial cutaway view of a mail stacker illustrating a workflow of the mail stacker being used to fill an automated mail tray, in accordance with an embodiment of the present disclosure.

FIG. 2 is partial cutaway schematic diagram illustrating the mail stacker 12 being used to transfer mail product 50 from various output pockets 18 into corresponding receiving containers (i.e., automated mail trays) 52. Although different mechanisms for operating the mail stacker 12 and other components of the mail sortation and transportation system 10 may not be illustrated in FIG. 2, the general methodology for movement of the mail product 50 and automated mail trays 52 is shown.

In the illustrated embodiment, the mail stacker 12 may include four rows 54 of output pockets 18 that can be filled with mail product 50 that is sorted and stacked via the mail stacker 12. However, it should be noted that other numbers and arrangements of the output pockets 18 may be utilized in other embodiments of the mail stacker 12.

Below each output pocket 18 is a shelf 56 generally extending outward from the mail stacker in the same direction as the output pocket 18. As shown, the shelves 56 may form part of the mail stacker 12 along with the ouput pockets 18. The shelves 56 are generally arranged one under each of the output pockets 18 to support a corresponding automated mail tray 52 to receive mail product 50 transferred from the output pocket 18. The shelves 56 generally have an open back side 58 that enables filled mail trays 52 to be removed from the shelves 56, for example, for transportation away from the mail stacker 12.

As illustrated, the output pockets 18 of a given mail stacker 12 are generally standardized, so that they are approximately the same size and shape for uniform mail collection and transfer to the automated mail trays 52. Similarly, the mail trays 52 may be standardized sizes that match the mail product capacity of the corresponding output pockets 18.

Figure 3:
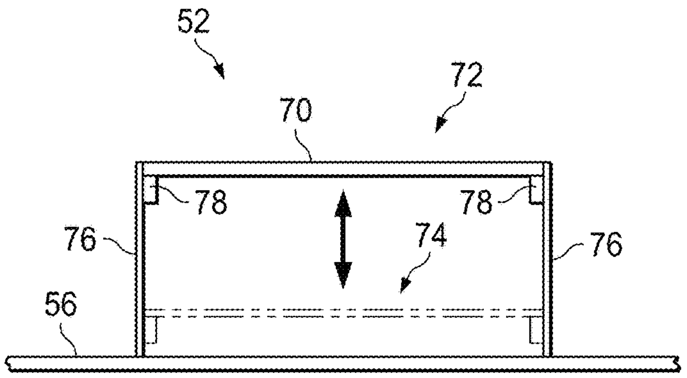
FIG. 3 is a schematic cross-sectional view of an automated mail tray with a moveable bottom plate, in accordance with an embodiment of the present disclosure.

To aid in the transfer of mail product 50 from the output pocket 18 to the automated mail trays 52, each mail tray 52 may feature a moveable bottom plate for supporting the mail product 50. FIG. 3 shows a more detailed embodiment of the automation mail tray 52, which includes a moveable bottom plate 70 that can be moved between an elevated position 72 and a lowered position 74. As shown, the bottom plate 70 may remain in a substantially flat horizontal plane (i.e., parallel with the shelf 56) when in both the elevated position 72 and in the lowered position 74. The bottom plate 70 may be generally aligned with an upper edge of the side walls 76 of the automated mail tray 52 when the bottom plate 70 is held in the elevated position 72.

In some embodiments, the moveable bottom plate 70 may be raised by exerting force under the bottom plate 70 and held in place while mail is being loaded onto the bottom plate 70. In some embodiments, the automated mail tray 52 may include an actuation mechanism 78 that automatically lifts the bottom plate 70 relative to the other portions (e.g., side walls 76) of the mail tray 52. In other embodiments, the shelf 56 upon which the automated mail tray 52 is disposed may feature an actuation mechanism (not shown) that selectively pushes up against the bottom plate 70 to move the bottom plate 70 to the elevated position 72 relative to the other portions (e.g., side walls 76) of the mail tray 52. Other mechanisms may be utilized in other embodiments for automatically moving the bottom plate 70 of the mail tray 52 between the elevated position 72 and the lowered position 74.

Turning back to FIG. 2, a more detailed description of the disclosed techniques for mail loading and transportation will be provided. First, a mail tray 52 may be inserted into place under the output pocket 18 of the mail stacker 12. This may involve an operator (or an automated system such as a robot or conveyor) placing the automated mail tray 52 on the shelf 56 below the corresponding output pocket 18. The mail tray 52 may be inserted into place on the shelf 56 from the open back side 58 of the mail stacker 12.

The mail tray 52 may be pushed outward along the shelf 56 until the mail tray 52 reaches a position substantially aligned with and disposed just below the output pocket 18. To that end, the shelf 56, the mail tray 52, and/or the output pocket 18 may include one or more alignment features (not shown) for aligning the automated mail tray 52 with the output pocket 18. In some embodiments, the automated mail tray 52 may be aligned with the output pocket 18 such that the bottom plate 70 of the automated mail tray 52 in the elevated position 72 is flush against the output pocket 18.

Figure 4:
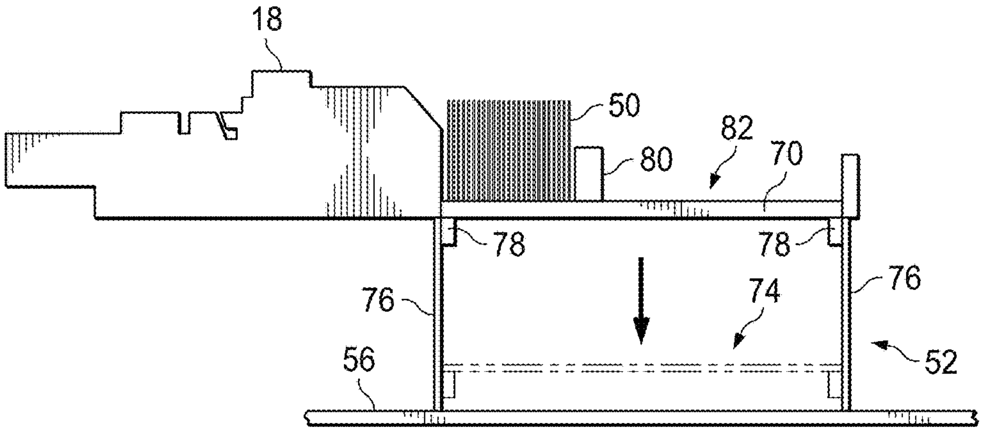
FIG. 4 is a schematic cross-sectional view of an output pocket of an automated mail stacker, in accordance with an embodiment of the present disclosure.

The mail stacker 12 may be operated to sort and stack mail product 50 into the bottom of the output pocket 18. In some embodiments, the mail product 50 may be sorted and stacked into desired output pockets 18 based on the functions of a Delivery Bar Code Sorter (DBCS). The mail stacker 12 may stack the mail product 50 until it generally fills the entire length of the output pocket 18. As an example, the output pocket 18 on the upper row 54A of the mail stacker 12 in FIG. 2 has been filled to capacity with mail product 50 that has been stacked into the output pocket 18. In some embodiments, the output pocket 18 may feature a stacker paddle 80, as shown in FIG. 4, that holds the mail product 50 together in a relatively tight stack throughout the process of filling the output pocket 18. A sliding position of the stacker paddle 80 relative to the rest of the output pocket 18 may be automatically controlled via a control system of the mail stacker 12.

In some embodiments, filling of the output pocket 18 may take place only after a mail tray 52 has been disposed in position directly under and/or aligned with the output pocket 18.

In such embodiments, the output pocket 18 may be configured with an opening 82 at the bottom, as shown in FIG. 4. That way, the bottom plate 70 of the mail tray 52, in the elevated position, may act as the "bottom" of the output pocket 18 upon which the mail product 50 is then stacked.

Figure 5:
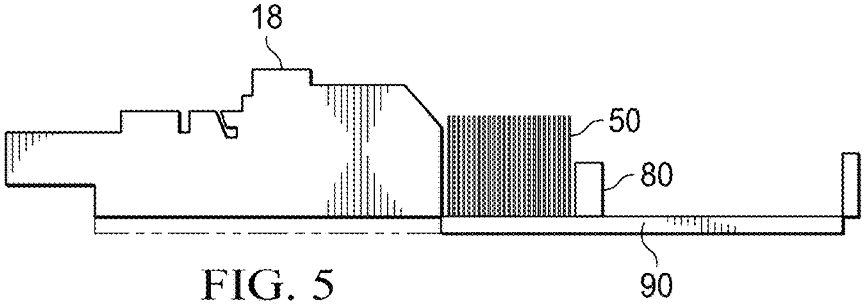
FIG. 5 is a schematic cross-sectional view of an output pocket of an automated mail stacker, in accordance with an embodiment of the present disclosure.

In other embodiments, filling of the output pocket 18 may take place before a mail tray 52 is disposed in position beneath the output pocket 18. In such embodiments, the output pocket 18 may feature a moveable bottom 90, as shown in FIG. 5. The movable bottom 90 generally allows the mail product 50 to accumulate within the output pocket 18 before a corresponding mail tray 52 is disposed under the output pocket 18. Once the automated mail tray 52 is disposed in position to receive the mail product 50, with the bottom plate 70 in the elevated position, the moveable bottom 90 of the output pocket 18 may be actuated to slide horizontally out from under the mail product 50. This facilitates a transfer of the mail product 50 from being supported on the moveable bottom 90 of the output pocket 18 to being supported on the elevated bottom plate 70 of the automated mail tray 52.

Turning back to FIG. 2, when a "full" or "near full" indication is detected (e.g., via a sensor), the mail product 50 on the top of the tray bottom 70 may be lowered (arrow 110) by lowering the bottom plate 70 from the elevated position to the lowered position at the bottom of the mail tray 52. This lowers the mail product 50 from a position bounded by the side walls of the output pocket 18 to a position bounded by the side walls of the mail tray 52. As the mail product 50 is transferred from the output pocket 18 to the automated mail tray 52 in this manner, the mail 50 remains in a generally tight stacked configuration since the side walls of the mail tray 52 are positioned close to the side walls of the output pocket 18.

The automated mail tray 52 disposed on the shelf 56 of the second row 54B of the mail stacker 12 includes the mail product 50 held in the lowered position within the mail tray 52. At this point, the mail product 50 is fully positioned within and supported by the automated mail tray 52. The tray 52 may then be extracted (arrow 112) out the back side 58 of the shelf 56 in the mail stacker 12 for storage or transportation to another location. For example, the tray 52 may be extracted out the back side 58 (either manually or automatically via a controlled mechanism) and sent to a storage grid, such as the above described tray storage and movement system 14. In some embodiments, the shelves 56 may be equipped with rollers 114 to facilitate insertion and removal of the automated mail trays 52. In other embodiments, the shelves 56 may themselves function as conveyors that can be controlled to facilitate movement of the automated mail tray 52 along the shelf 56.

As shown on the output pocket 18 of the third row 54C, the mail stacker 12 may begin to sort and stack additional mail product 50 into the output pocket 18 while the automated mail tray 52 is being removed off the corresponding shelf 56. Again, the output pocket 18 may continue to support this mail product 50 from below via a moveable bottom (e.g., 90 of FIG. 5) that is positioned below the mail product 50 during filling of the output pocket 18. After the automated mail tray 52 is removed from the mail stacker 12, another empty automated mail tray 52 may be positioned in its place along the shelf 56, allowing the mail loading and transportation process to continue.

Figure 6:
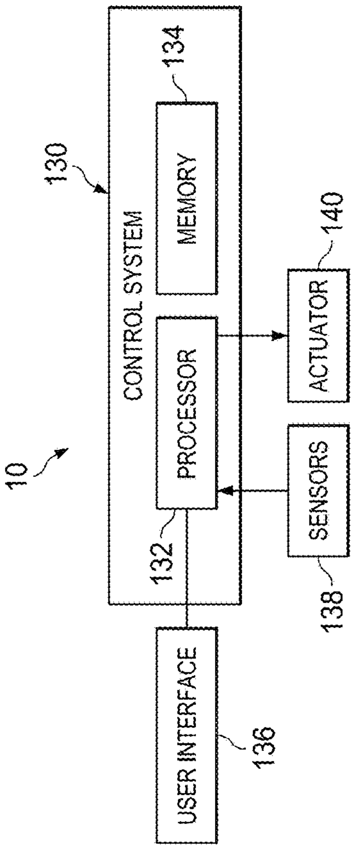
FIG. 6 is a block diagram illustrating automation and control components of a mail sortation and transportation system, in accordance with an embodiment of the present disclosure.

FIG. 6 is a schematic block diagram illustrating various automation and control components that may be used throughout the disclosed mail sortation and transportation system 10. The system 10 may generally include a control system 130 having at least one processor component 132 and at least one memory component 134. In some embodiments, the control system 130 may include one or more separate control systems that are communicatively coupled together to provide control and monitoring of the mail loading process.

The control system 130 utilizes the at least one processor component 132 and the at least one memory component 134 to monitor and/or control various mail stacking and loading operations at the mail sortation and transportation system 10. For example, one or more processor components 132 may be designed to execute instructions encoded into the one or more memory components 134. Upon executing these instructions, the processors 132 may monitor the operational states of certain components of the mail sortation and transportation system 10. In addition, the processors 132 may control operation of various components (e.g., mail stacker 12, mail tray 52, output pocket 18, tray storage and movement system 14, etc.), of the system 10 based on sensor feedback. This may help to control the loading and transportation of the mail trays 52 throughout the system 10.

As shown, the processors 132 may be coupled to a user interface 136 that enables an operator to input instructions for execution by the control system 130. The control system 130 may output certain control signals to the system components based on the commands received from an operator at the user interface 136. The user interface 136 may also output data relating to the operational state of the mail sortation and transportation system 10. For example, the user interface 136 may provide an operator with information about each mail tray 52 that is disposed in the mail stacker 12, such as a position of the mail tray 52, whether the mail tray 52 is full or empty, and a position of the moveable bottom plate 70. In addition, the user interface 136 may output alerts to the operator in response to unexpected events encountered during mail sorting, stacking, loading, and transportation operations.

As shown, the control system 130 may be communicatively coupled to a number of sensors 138 disposed about the mail sortation and transportation system 10. These sensors may include, for example, optical sensors, acoustic sensors, proximity sensors, load cells, and/or others. Based on feedback from these sensors 138, the control system 130 may determine when to actuate certain components of the system 10. The control system 130 may also be communicatively coupled to a number of controllable components (actuators 140) located throughout the mail stacker 12, the automated mail trays 52, the output pockets 18, the tray storage and movement system 14, and/or the tray to feeder path 16. The control system 130 may actuate certain of these controllable components 140 based on sensor feedback.

For example, the control system 130 may actuate the moveable bottom 90 of the output pocket 18 to horizontally slide out of the way only once a sensor 138 determines that a corresponding mail tray 52 is disposed beneath the output pocket 18 and has its bottom plate 70 in the elevated position. In addition, the control system 130 may control operation of the mail stacker 12 such that the mail stacker 12 prevents mail product 50 from being fed into a particular output pocket 18 that is in the process of having the corresponding mail tray 52 changed (transitioned off the shelf 56 and replaced by another mail tray 52) until the transition is complete. This may eliminate mail product 50 from being rejected for an unavailable stacker destination. In embodiments where the output pocket 18 includes a moveable bottom 90, the control system 130 may control the mail stacker 12 to fill the output pocket 18 only once sensor feedback indicates that the moveable bottom 90 has been actuated to cover the opening in the bottom of the output pocket 18. In embodiments where the output pocket 18 includes an opening 82 at the bottom, the control system 130 may control actuation of the bottom plate 70 of the automated mail tray 52 so that the bottom plate 70 lowers only once a sensor 138 detects that the output pocket 18 is full. Various other control and automation processes may be performed by the control system 130 to facilitate efficient operation of the mail sortation and transportation system 10.

The disclosed embodiments may enable various mail sorting, stacking, and transportation operations to be performed without operator intervention. The controlled actuation of the bottom plate 70 of each mail tray 52 may facilitate a fully automated and streamlined loading of mail product 50 from the stacker output pockets 18 into transportable mail trays 52, which can then be removed from the mail stacker 12. By automating this process of loading the mail trays 52, the disclosed embodiments enable the mail stacker 12 to operate as a standalone unit that does not depend on a human operator to move sorted mail into receiving containers. Further, all human errors, such as dropped or disordered mail product, may be eliminated from the process of loading sorted mail into respective mail trays.

Although the present disclosure and its advantages have been described in detail, it should be understood that various changes, substitutions and alterations can be made herein without departing from the spirit and scope of the disclosure as defined by the following claims.

What is claimed is:

1. A mail sortation and transportation system, comprising:

a mail stacker comprising an output pocket, wherein the mail stacker is configured to receive mail product and to stack at least a portion of the mail product into the output pocket, wherein the output pocket comprises a bottom, wherein the bottom of the output pocket is configured to receive the mail product thereon during stacking of the mail product into the output pocket, wherein the bottom of the output pocket is selectively removable via horizontal sliding of the bottom relative to side walls of the output pocket;

a shelf disposed under the output pocket of the mail stacker; and an automated mail tray comprising a bottom plate that is moveable between an elevated position and a lowered position, wherein the automated mail tray is removably disposed on the shelf for receiving mail product transferred from the output pocket, wherein the bottom plate of the automated mail tray is configured to support the mail product disposed thereon in the output pocket when the bottom of the output pocket is removed and the bottom plate is in the elevated position, and wherein the automated mail tray is aligned in a vertical direction with the output pocket when positioned on the shelf under the output pocket such that the bottom plate of the automated mail tray in the elevated position is directly beneath the bottom of the output pocket and flush against the output pocket.

2. The mail sortation and transportation system of claim 1, wherein the shelf comprises rollers to facilitate insertion and removal of the automated mail tray.

3. The mail sortation and transportation system of claim 1, wherein the output pocket comprises an automated stacker paddle.

4. The mail sortation and transportation system of claim 1, wherein the shelf is integrated into the mail stacker.

5. The mail sortation and transportation system of claim 4, wherein the mail stacker comprises a plurality of output pockets and is configured to receive mail product and to stack the mail product into at least one of the plurality of output pockets, and a plurality of shelves each disposed under a corresponding one of the plurality of output pockets.

6. The mail sortation and transportation system of claim 1, wherein the shelf comprises an open back side to allow the automated mail tray to be inserted or removed from the shelf.

7. The mail sortation and transportation system of claim 1, further comprising a tray storage and movement system configured to transport the automated mail tray onto the shelf, away from the shelf, or onto a tray to feeder path.

8. A method, comprising:

filling an output pocket of a mail stacker with mail product received at the mail stacker, wherein the output pocket comprises a bottom that supports the mail product received from the mail stacker thereon;

positioning an automated mail tray on a shelf under the output pocket, wherein the automated mail tray comprises a bottom plate that is moveable between an elevated position and a lowered position;

aligning the automated mail tray with the output pocket when positioning the automated mail tray on the shelf under the output pocket such that the bottom plate of the automated mail tray in the elevated position is flush against the output pocket;

raising the bottom plate of the automated mail tray to a position directly beneath the bottom of the output pocket;

upon filling the output pocket, horizontally sliding the bottom of the output pocket relative to side walls of the output pocket to remove the bottom of the output pocket from a position supporting the mail product thereon;

supporting the mail product within the output pocket via the bottom plate of the automated mail tray positioned in the elevated position; and automatically transferring the mail product from the output pocket into the automated mail tray by lowering the movable bottom plate of the automated mail tray from the elevated position to the lowered position while the mail product is supported on the bottom plate.

9. The method of claim 8, further comprising extracting the automated mail tray with the mail product from the shelf for transportation of the mail product to another location.

10. The method of claim 9, further comprising replacing the automated mail tray by positioning another automated mail tray on the shelf.

11. The method of claim 8, further comprising positioning the automated mail tray on the shelf under the output pocket while the output pocket is being filled with the mail product.

12. The method of claim 8, further comprising automatically controlling a position of a stacker paddle disposed in the output pocket to facilitate filling the output pocket with the mail product.

13. The method of claim 8, further comprising detecting whether the output pocket is full of mail product, and controlling the automated mail tray to lower the bottom plate from the elevated position to the lowered position.

14. The method of claim 8, further comprising preventing the mail stacker from filling the output pocket with mail product when the automated mail tray is being traded out for another automated mail tray.

15. A mail sortation and transportation system, comprising:

a mail stacker comprising an output pocket, wherein the mail stacker is configured to receive mail product and to stack at least a portion of the mail product into the output pocket, wherein the output pocket comprises side walls, wherein the output pocket comprises an opening at a bottom of the output pocket between the side walls;

a shelf disposed under the output pocket of the mail stacker; and an automated mail tray comprising a bottom plate that is moveable between an elevated position and a lowered position, wherein the automated mail tray is removably disposed on the shelf for receiving mail product transferred from the output pocket, wherein the automated mail tray is aligned with the output pocket when positioned on the shelf under the output pocket such that the bottom plate of the automated mail tray in the elevated position covers the opening between the side walls of the output pocket, and wherein the bottom plate of the automated mail tray is configured to support the mail product disposed thereon in the output pocket when the bottom plate is in the elevated position, wherein the bottom plate of the automated mail tray acts as a bottom of the output pocket during stacking of the mail product.

16. The mail sortation and transportation system of claim 15, wherein the shelf comprises rollers to facilitate insertion and removal of the automated mail tray.

17. The mail sortation and transportation system of claim 15, wherein the output pocket comprises an automated stacker paddle.

18. The mail sortation and transportation system of claim 15, wherein the shelf is integrated into the mail stacker.

19. The mail sortation and transportation system of claim 18, wherein the mail stacker comprises a plurality of output pockets and is configured to receive mail product and to stack the mail product into at least one of the plurality of output pockets, and a plurality of shelves each disposed under a corresponding one of the plurality of output pockets.

* * * * *